United States Patent
Tanaka et al.

(10) Patent No.: US 9,871,596 B2
(45) Date of Patent: Jan. 16, 2018

(54) OPTICAL RECEIVER AND SIGNAL PROCESSING METHOD

(71) Applicant: FUJITSU LIMITED, Kawasaki-shi, Kanagawa (JP)

(72) Inventors: Daijiro Tanaka, Plano, TX (US); Hideyuki Matsuura, Sendai (JP); Osamu Takeuchi, Kawasaki (JP); Takeshi Hoshida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/200,693

(22) Filed: Jul. 1, 2016

(65) Prior Publication Data
US 2017/0041080 A1    Feb. 9, 2017

(30) Foreign Application Priority Data
Aug. 3, 2015   (JP) ................... 2015-153632

(51) Int. Cl.
*H04B 10/06*   (2006.01)
*H04B 10/61*   (2013.01)

(52) U.S. Cl.
CPC .................... *H04B 10/61* (2013.01)

(58) Field of Classification Search
CPC ........ H04B 10/61; H04B 10/60; H04B 10/66; H04B 10/616; H04B 10/5057;
(Continued)

(56) References Cited

U.S. PATENT DOCUMENTS

| 7,209,664 | B1 * | 4/2007 | McNicol | H04B 10/50 375/219 |
| 7,526,211 | B2 * | 4/2009 | Mcnicol | H04B 10/50 398/128 |

(Continued)

FOREIGN PATENT DOCUMENTS

| JP | 2004-336563 | 11/2004 |
| JP | 2011-199687 | 10/2011 |

(Continued)

OTHER PUBLICATIONS

Floyd M. Gardner, "A BPSK/QPSK Timing-Error Detector for Sampled Receivers", IEEE Transactions on Communications, vol. COM-34, No. 5, May 1986, pp. 423-429 (7 pages).

(Continued)

*Primary Examiner* — Hibret Woldekidan
(74) *Attorney, Agent, or Firm* — Fujitsu Patent Center

(57) ABSTRACT

An optical receiver including: a digital filter that performs spectral shaping on a signal; an analyzer that analyzes a spectrum waveform of the signal; a determiner that determines, based on an analysis result by the analyzer, whether the spectrum waveform of the signal is a Nyquist waveform on the basis of a Nyquist first reference; and a controller that stops the spectral shaping of the signal to be performed by the digital filter when the spectrum waveform of the signal is not the Nyquist waveform as a result of the determination by the determiner, and controls a filter coefficient of the digital filter based on the spectrum waveform of the signal when the spectrum waveform of the signal is the Nyquist waveform as the result of the determination by the determiner.

10 Claims, 14 Drawing Sheets

(58) Field of Classification Search
CPC .............. H04B 10/2507; H04B 10/697; H04B 10/07955; H04L 27/223; H04L 25/03
USPC .................. 398/202–204, 206, 208–210, 213
See application file for complete search history.

(56) References Cited

U.S. PATENT DOCUMENTS

| | | | | |
|---|---|---|---|---|
| 7,813,655 | B2* | 10/2010 | Kikuchi | H04B 10/2507 398/208 |
| 8,639,118 | B2* | 1/2014 | Wu | H04B 10/616 398/140 |
| 8,655,190 | B2* | 2/2014 | Wu | H04B 10/5053 398/202 |
| 8,682,175 | B2* | 3/2014 | Forghieri | H04B 10/07953 398/162 |
| 8,855,503 | B2* | 10/2014 | Kikuchi | H04B 10/677 398/208 |
| 8,953,950 | B2* | 2/2015 | Nazarathy | H03M 1/145 398/188 |
| 9,083,459 | B2* | 7/2015 | Oda | H04B 10/564 |
| 9,467,228 | B2* | 10/2016 | Nakashima | H04B 10/2572 |
| 9,467,318 | B2* | 10/2016 | Tanaka | H04L 27/2275 |
| 9,559,771 | B2* | 1/2017 | Oda | H04B 10/5057 |
| 2004/0224657 | A1* | 11/2004 | Matsusaka | H04B 1/1036 455/278.1 |
| 2011/0229127 | A1 | 9/2011 | Sakamoto et al. | |
| 2012/0128377 | A1 | 5/2012 | Hatae et al. | |
| 2016/0020853 | A1* | 1/2016 | Akiyama | H04B 10/07955 398/38 |

FOREIGN PATENT DOCUMENTS

| | | |
|---|---|---|
| JP | 2012-114599 | 6/2012 |
| JP | 2014-72824 | 4/2014 |

OTHER PUBLICATIONS

Michael G. Taylor, "Phase Estimation Methods for Optical Coherent Detection Using Digital Signal Processing", Journal of Lightwave Technology, vol. 27, No. 7, Apr. 1, 2009, pp. 901-914 (14 pages).

* cited by examiner

WAVELENGTH MULTIPLEX OPTICAL SIGNAL
HAVING NON-NYQUIST WAVEFORM

WAVELENGTH MULTIPLEX OPTICAL SIGNAL
HAVING NYQUIST WAVEFORM

WAVELENGTH MULTIPLEX OPTICAL SIGNAL IN WHICH NON-NYQUIST
WAVEFORM AND NYQUIST WAVEFORM ARE MIXED

NYQUIST WAVEFORM AFTER FILTERING

NON-NYQUIST WAVEFORM AFTER FILTERING

NON-NYQUIST
WAVEFORM

NYQUIST
WAVEFORM

NON-NYQUIST
WAVEFORM

NYQUIST
WAVEFORM

ALARM #1

ALARM #2

ALARM #3

ALARM #4

OPTICAL RECEIVER AND SIGNAL PROCESSING METHOD

CROSS-REFERENCE TO RELATED APPLICATION

This application is based upon and claims the benefit of priority of the prior Japanese Patent Application No. 2015-153632 filed on Aug. 3, 2015, the entire contents of which are incorporated herein by reference.

FIELD

A certain aspect of the embodiments is related to an optical receiver and a signal processing method.

BACKGROUND

For example, in accordance with increase of the demand for large-capacity data transmission, the research and the development of a digital coherent optical transmission system that enables data transmission more than 100 (Gbps) by a single wavelength light are performed. In the digital coherent optical transmission system, not only an intensity of light but also a phase of the light is used for signal modulation, unlike an intensity modulation system. For example, DP (Dual-Polarization)-QPSK (Quaternary Phase Shift Keying) is mentioned as such a modulation system.

In the Wavelength Division Multiplex (WDM), there is used an optical signal formed to a spectral waveform (hereinafter referred to as "Nyquist waveform) satisfying a Nyquist first reference which is a condition for suppressing inter-code interference of a signal in order to effectively utilize a frequency band (see e.g. Japanese Laid-open Patent Publication No. 2014-72824). When the optical signal having the Nyquist waveform is transmitted by the digital coherent optical transmission system, a transmitting device of a reception side photoelectrically converts a received optical signal into a digital signal, and then performs spectral shaping on the digital signal with the use of a digital filter, such as a FIR (Finite Impulse Response) filter, in order to improve reception characteristics.

SUMMARY

According to an aspect of the embodiments, there is provided an optical receiver including: a digital filter that performs spectral shaping on a signal; an analyzer that analyzes a spectrum waveform of the signal; a determiner that determines, based on an analysis result by the analyzer, whether the spectrum waveform of the signal is a Nyquist waveform on the basis of a Nyquist first reference; and a controller that stops the spectral shaping of the signal to be performed by the digital filter when the spectrum waveform of the signal is not the Nyquist waveform as a result of the determination by the determiner, and controls a filter coefficient of the digital filter based on the spectrum waveform of the signal when the spectrum waveform of the signal is the Nyquist waveform as the result of the determination by the determiner.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

When an optical signal having a spectral waveform other than the Nyquist waveform is received, if the spectral shaping is performed on the optical signal, the edges of the spectrum are deleted by filtering, and hence the reception characteristics of the optical signal deteriorate. On the contrary, when a control signal (or a pilot signal) for controlling the filtering of an optical receiver side is transmitted from an optical transmitter to an optical receiver, the deterioration of the reception characteristics of the optical signal is avoided.

However, the control signal occupies a part of the transmission band, and hence a transmission efficiency of a user signal including user's data decreases. When a transmission rate of the control signal is reduced, the transmission efficiency of the user signal increases. However, an accuracy of filtering control of the reception side decreases, and hence the reception characteristics of the optical signal deteriorate.

Figure 1:
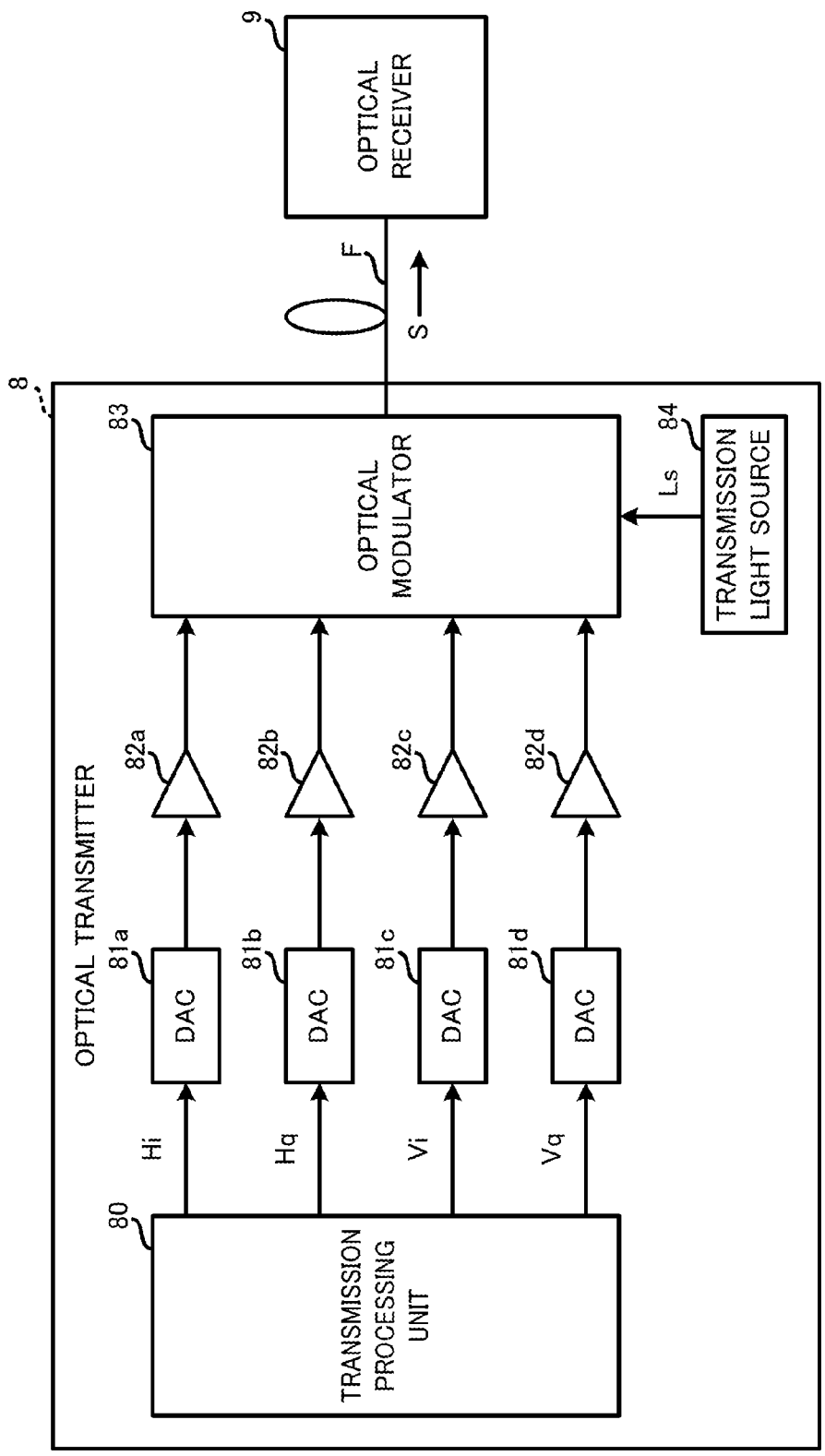
FIG. 1 is a diagram illustrating the configuration of an optical transmitter.

FIG. 1 is a diagram illustrating an example of the configuration of an optical transmitter 8. The optical transmitter 8 transmits an optical signal S to an optical receiver 9 via a transmission line F based on a digital coherent optical transmission system as an example. The optical transmitter 8 includes a transmission processing unit 80, digital to analog converters (DAC) 81*a* to 81*d*, driver amplifiers 82*a* to 82*d*, an optical modulator 83 and a transmission light source 84.

The transmission processing unit 80 is made of a Digital Signal Processor (DSP), for example, performs symbol mapping by sampling a user signal inputted from another device, converts the user signal into four digital signals Hi, Hq, Vi and Vq, and outputs the digital signals Hi, Hq, Vi and Vq to the DAC 81*a* to 81*d*, respectively. The digital signals Hi and Hq are a signal of an I-channel and a signal of a Q-channel corresponding to H-axis polarization, respectively. The digital signals Vi and Vq are a signal of an I-channel and a signal of a Q-channel corresponding to V-axis polarization, respectively. An H-axis and a V-axis are examples of polarization axes.

The DAC 81*a* to 81*d* convert the digital signals Hi, Hq, Vi and Vq into analog signals, and output the analog signals to the driver amplifiers 82*a* to 82*d*, respectively. The driver amplifiers 82*a* to 82*d* amplify the analog signals inputted from the DAC 81*a* to 81*d*, respectively, and output the amplified analog signals to the optical modulator 83.

The optical modulator 83 includes a Mach-Zehnder modulator, a polarization beam combiner (PBC), and so on. The optical modulator 83 modulates an output light Ls from the transmission light source 84 with the use of the analog signals inputted from the driver amplifiers 82*a* to 82*d*, and performs polarization multiplexing on an H-axis polarized component and a V-axis polarized component. Thereby, the optical modulator 83 generates an optical signal S, and transmits the optical signal S to the optical receiver 9. The optical signal S is a polarization multiplex QPSK signal modulated by DP-QPSK as an example, but is not limited to this. The optical signal S may be a polarization multiplex QAM (Quadrature Amplitude Modulation) signal modulated by QAM, for example.

The optical transmitter 8 transmits an optical signal S having a Nyquist waveform based on a Nyquist first reference, and an optical signal S having a waveform (hereinafter referred to as "non-Nyquist waveform") other than the Nyquist waveform to the optical receiver 9. The Nyquist first reference is a condition for preventing inter-code interference of a signal, and is expressed by a following formula (1) as an example. In the formula (1), "R" denotes a symbol rate of the signal, "f" denotes a frequency, and "C" denotes a spectrum of the signal. When the formula (1) is satisfied, the spectrum of the signal intersects a time axis at time intervals of 1/R (excluding time=0), and hence the inter-code interference does not occur.

$$\sum_{-\infty}^{\infty} C(f - nR) = 1/R \quad (1)$$

Figure 2A:
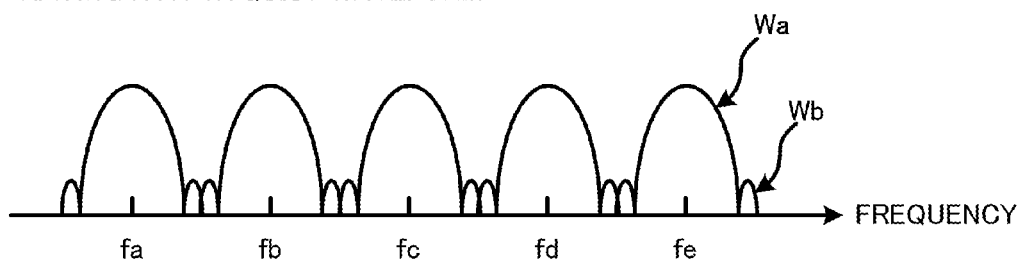
FIG. 2A is a waveform diagram illustrating an example of a wavelength multiplex optical signal having a non-Nyquist waveform.
Figure 2B:
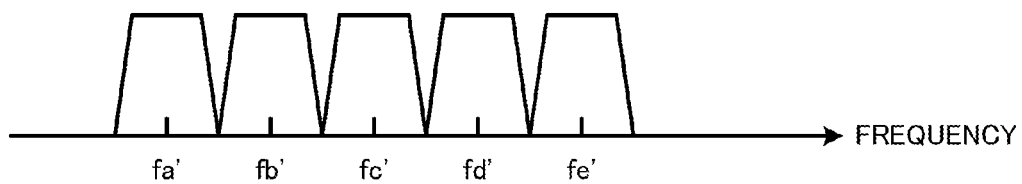
FIG. 2B is a waveform diagram illustrating an example of a wavelength multiplex optical signal having a Nyquist waveform.

FIG. 2A is a waveform diagram illustrating an example of a wavelength multiplex optical signal having the non-Nyquist waveform. FIG. 2B is a waveform diagram illustrating an example of a wavelength multiplex optical signal having the Nyquist waveform. In FIGS. 2A and 2B, a horizontal axis denotes a frequency.

In the spectrums of respective optical signals multiplexed to the wavelength multiplex optical signal, frequencies fa to fe and fa' to fe' set at even intervals are central frequencies. The spectrum of the non-Nyquist waveform includes a main lobe Wa and side lobes Wb, and therefore the spectrum of the non-Nyquist waveform includes a frequency interval larger than a frequency interval of the spectrum of the Nyquist waveform so as not to interfere with an adjacent spectrum.

On the other hand, the rise and fall of a pulse of the Nyquist waveform is steeper than that of a pulse of the non-Nyquist waveform, and the spectrum of the Nyquist waveform does not substantively include the side lobes like the non-Nyquist waveform. For this reason, the optical signal of the Nyquist waveform can be arranged at the frequency interval smaller than the frequency interval of the non-Nyquist waveform, and it is possible to increase transmission capacity of the wavelength multiplex transmission.

However, while the wavelength multiplex optical transmission of the Nyquist waveform is used together with the wavelength multiplex optical transmission of the non-Nyquist waveform, it is considered that the wavelength multiplex optical signal in which the Nyquist waveform and the non-Nyquist waveform are mixed is transmitted.

Figure 2C:
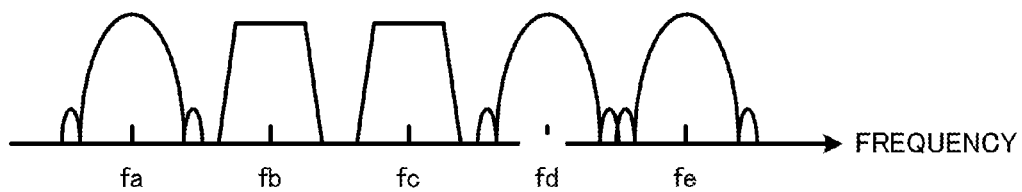
FIG. 2C is a waveform diagram illustrating an example of a wavelength multiplex optical signal in which the non-Nyquist waveform and the Nyquist waveform are mixed.

FIG. 2C is a waveform diagram illustrating an example of a wavelength multiplex optical signal in which the non-Nyquist waveform and the Nyquist waveform are mixed. When the non-Nyquist waveform and the Nyquist waveform are mixed, the respective spectrum are arranged at wide frequency intervals (fa to fe), as illustrated in FIG. 2A.

The optical transmitter 8 can transmit both of the optical signal S having the Nyquist waveform and the optical signal S having the non-Nyquist waveform to be able to cope with all cases of FIGS. 2A to 2C. When the optical receiver 9 receives the optical signal S having the Nyquist waveform, the optical receiver 9 photoelectrically converts the optical signal S into a digital signal, and then performs spectral shaping on the digital signal with the use of a FIR (Finite Impulse Response) filter as described later, in order to improve reception characteristics.

Figure 3A:
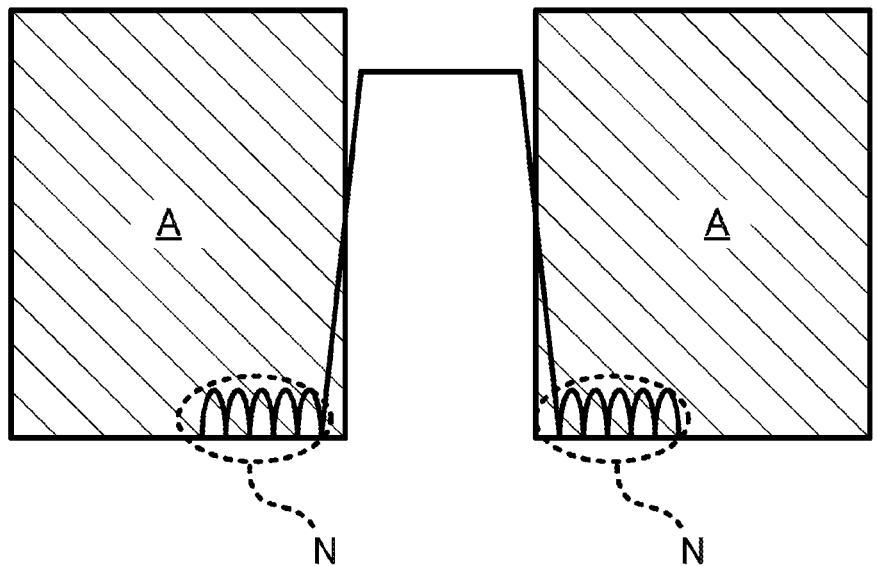
FIG. 3A is a waveform diagram illustrating an example of the Nyquist waveform after filtering.

FIG. 3A is a waveform diagram illustrating an example of the Nyquist waveform after filtering. Signs "A" indicate cutoff regions of the FIR filter of the optical receiver 9. The spectrum of the Nyquist waveform is filtered by the FIR filter, a noise component N is removed, and hence the reception characteristics are improved. However, if the same filtering processing is also performed on the spectrum of the non-Nyquist waveform, the reception characteristics deteriorate.

Figure 3B:
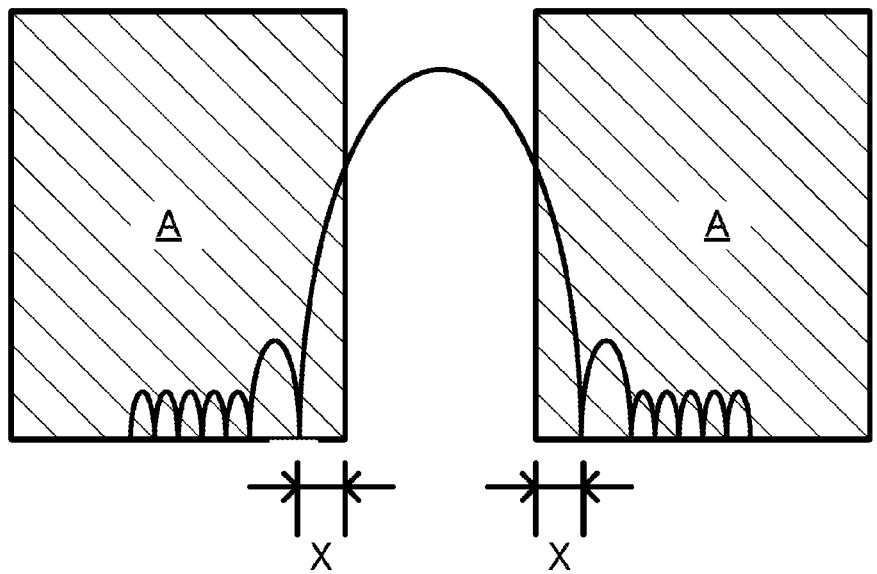
FIG. 3B is a waveform diagram illustrating an example of the non-Nyquist waveform after the filtering.

FIG. 3B is a waveform diagram illustrating an example of the non-Nyquist waveform after the filtering. In the spectrum of the non-Nyquist waveform, both edges X required for data reception are deleted by the filtering. Therefore, when the filtering processing is performed on the spectrum of the non-Nyquist waveform, the reception characteristics deteriorate.

On the contrary, when a control signal (or a pilot signal) for controlling the filtering is transmitted from the optical transmitter 8 to the optical receiver 9, the deterioration of the reception characteristics of the optical signal S is avoided. However, the control signal occupies a part of the transmission band, and hence a transmission efficiency of a user signal including user's data decreases. When a transmission rate of the control signal is reduced, the transmission efficiency of the user signal increases. However, an accuracy of filtering control of the reception side decreases, and hence the reception characteristics of the optical signal S deteriorate.

After converting the received optical signal S into electric digital signals, the optical receiver 9 determines whether the waveform of each of the digital signals is the Nyquist waveform by performing a spectral analysis, and controls the filter in accordance with the result of the determination. Thereby, the optical receiver 9 improves the reception characteristics of the optical signal S without decreasing the transmission efficiency. Hereinafter, the configuration of the optical receiver 9 is mentioned.

Figure 4:
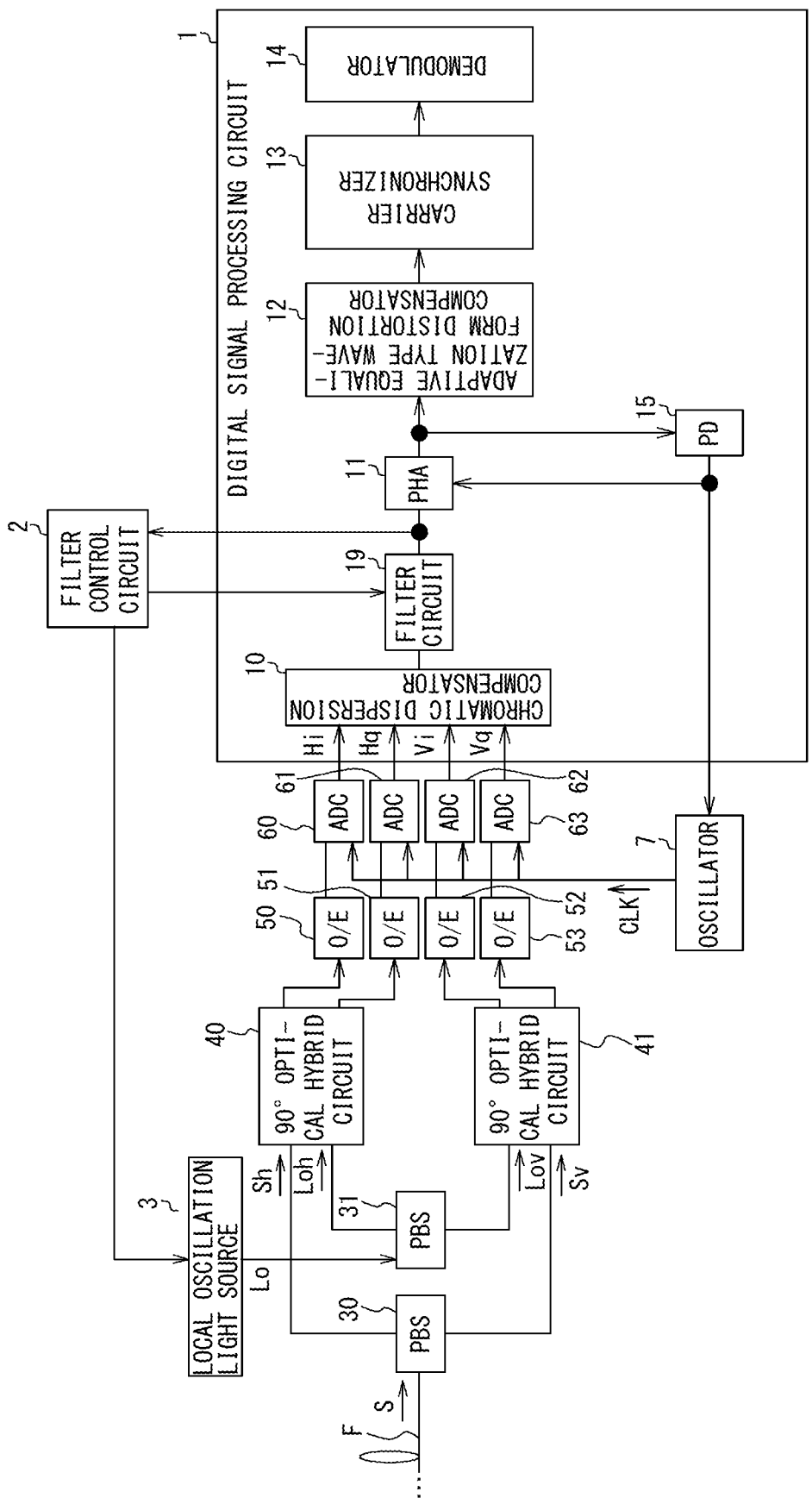
FIG. 4 is a diagram illustrating an example of the configuration of an optical receiver.

FIG. 4 is a diagram illustrating an example of the configuration of the optical receiver 9. The optical receiver 9 receives from the optical transmitter 8 the optical signal S transmitted in accordance with a digital coherent optical transmission system, detects signal light components Sh and Sv with the use of a local oscillation light Lo, converts the signal light components Sh and Sv into digital signals Hi, Hq, Vi and Vq, and demodulates the digital signals according to a demodulation system corresponding to a modulation system of the optical transmitter 8.

The optical receiver 9 includes: a filter control circuit 2; a local oscillation light source 3 which is an example of a light source; polarization beam splitters (PBS) 30 and 31; 90° optical hybrid circuits 40 and 41; and photoelectric conversion circuits (O/E) 50 to 53. Moreover, the optical receiver 9 further includes: analog-digital converter (ADC) 60 to 63; an oscillator 7; and a digital signal processing circuit 1. The PBS 30 and 31; the 90° optical hybrid circuits 40 and 41, and the photoelectric conversion circuits (O/E) 50 to 53 are an example of a receiver, makes the local oscillation light Lo of the local oscillation light source 3 interfere with the optical signal S inputted from the transmission line F and converts the optical signal S into electric signals to receive the digital signals Hi, Hq, Vi and Vq.

The PBS 30 splits the optical signal S inputted from the optical transmitter 8 via the transmission line F into an H axis and a V axis (polarization axes). Signal light components Sh and Sv of the H axis and the V axis are inputted to the 90° optical hybrid circuits 40 and 41, respectively.

Moreover, the local oscillation light source 3 outputs to the PBS 31 the local oscillation light Lo synchronized with the output light Ls of the optical transmitter 8. The PBS 31 splits the local oscillation light Lo inputted from the local oscillation light source 3 into the H axis and the V axis. Local oscillation light components Loh and Lov of the H axis and the V axis are inputted to the 90° optical hybrid circuits 40 and 41, respectively.

The 90° optical hybrid circuit 40 has a waveguide for making the inputted signal light component Sh and the inputted local oscillation light component Loh interfere with each other, and detects the signal light component Sh. The 90° optical hybrid circuit 40 outputs, as a result of the detection, an optical component depending on an amplitude and a phase of the I-channel and an optical component depending on an amplitude and a phase of the Q-channel to the photoelectric conversion circuits 50 and 51, respectively.

The 90° optical hybrid circuit 41 has a waveguide for making the inputted signal light component Sv and the inputted local oscillation light component Lov interfere with each other, and detects the signal light component Sv. The 90° optical hybrid circuit 41 outputs, as a result of the detection, an optical component depending on an amplitude and a phase of the I-channel and an optical component depending on an amplitude and a phase of the Q-channel to the photoelectric conversion circuits 52 and 53, respectively.

The photoelectric conversion circuits 50 to 53 convert the inputted optical components into electric signals, and outputs the electric signals to the ADC 60 to 63, respectively. Photodetectors are used as the photoelectric conversion circuits 50 to 53, for example.

The ADC 60 to 63 sample the electric signals inputted from the photoelectric conversion circuits 50 to 53 by using a clock signal CLK inputted from the oscillator 7, and hence converts the electric signals into the digital signals Hi, Hq, Vi and Vq, respectively. That is, the digital signals Hi, Hq, Vi and Vq are generated by sampling the electric signals in synchronization with the clock signal CLK. The digital signals Hi, Hq, Vi and Vq are inputted to the digital signal processing circuit 1.

The oscillator 7 changes a frequency of the clock signal CLK in accordance with a control from the digital signal processing circuit 1. That is, the frequency of the clock signal CLK is variable. A voltage-controlled oscillator (VCO) is used as the oscillator 7, for example.

The digital signal processing circuit 1 includes a chromatic dispersion compensator 10, a filter circuit 19, a phase adjuster (PHA) 11, an adaptive equalization type waveform distortion compensator 12, a carrier synchronizer 13, a demodulator 14 and a phase detector (PD) 15. The digital signal processing circuit 1 is composed of a DSP (Digital Signal Processor), for example. In FIG. 4, the digital signals Hi, Hq, Vi and Vq in a post-stage of the chromatic dispersion compensator 10 are expressed with a single arrow for simplification.

The chromatic dispersion compensator 10 compensates the waveform distortion of the digital signals Hi, Hq, Vi and Vq generated by chromatic dispersion in the transmission line F. The chromatic dispersion compensator 10 outputs to the filter circuit 19 the digital signals Hi, Hq, Vi and Vq whose waveform distortion has been compensated.

The filter circuit 19 performs the spectral shaping of the digital signals Hi, Hq, Vi and Vq. The spectral shaping of the digital signals Hi, Hq, Vi and Vq can be stopped by the control from the filter control circuit 2. The digital signals Hi, Hq, Vi and Vq are outputted from the filter circuit 19 to the PHA 11.

The PHA 11 and the PD 15 control the phase of the digital signals Hi, Hq, Vi and Vq. The PD 15 detects the phase fluctuation of the digital signals Hi, Hq, Vi and Vq outputted from the PHA 11. A phase detector of the Gardner system is used as a detection means of the phase fluctuation, for example. Here, the Gardner system is described in a document "F. M. Gardner, IEEE Transactions on Communications, 34, No. 5, 1986", for example.

The PHA 11 adjusts (compensates) a sampling phase by delaying the digital signals Hi, Hq, Vi and Vq based on a detection result of the PD 15. The PHA 11 adjusts the sampling phase by multiplying the digital signals Hi, Hq, Vi and Vq converted into the signals of a frequency domain by a rotor coefficient corresponding to a target value of the phase.

Thereby, high-speed phase fluctuation such as a jitter caused in the digital signals Hi, Hq, Vi and Vq in the optical receiver 9 is reduced. The PHA 11 outputs the digital signals Hi, Hq, Vi and Vq whose phase has been adjusted to the adaptive equalization type waveform distortion compensator 12.

The oscillator 7 adjusts the frequency of the clock signal CLK based on the detection result of the PD 15. Consequently, the sampling phase of the ADCs 60 to 63 is controlled depending on a phase shift of the digital signals Hi, Hq, Vi and Vq.

The adaptive equalization type waveform distortion compensator 12 compensates the waveform distortion of the digital signals Hi, Hq, Vi and Vq. The adaptive equalization type waveform distortion compensator 12 includes a plurality of filter circuits, and compensates the waveform distortion that fluctuates faster than waveform distortion of the chromatic dispersion compensator 10 to be compensated by changing in real time the characteristics of the filter circuits depending on the characteristic of the digital signals Hi, Hq, Vi and Vq. The digital signals Hi, Hq, Vi and Vq whose waveform distortion has been compensated are outputted to the carrier synchronizer 13.

The carrier synchronizer 13 presumes and corrects the differences of the frequency and the phase which the carrier of the digital signals Hi, Hq, Vi and Vq has. A presumption means of the difference of the phase is described in a document "M. G. Taylor, "Phase Estimation Methods for Optical Coherent Detection Using Digital Signal Processing", JOURNAL OF LIGHTWAVE TECHNOLOGY, VOL. 27, NO. 7, APRIL 1, 901-914, 2009", for example. The carrier synchronizer 13 outputs the digital signals Hi, Hq, Vi and Vq in which correction process is performed, to the demodulator 14.

The demodulator 14 demodulates the digital signals Hi, Hq, Vi and Vq by recognizing the signal point based on the signal constellation depending on the modulation system. The digital signal processing circuit 1 further may include a FEC (Forward Error Correction) circuit that corrects an error by the FEC of the digital signals Hi, Hq, Vi and Vq at a post-stage of the demodulator 14.

Moreover, the filter control circuit 2 acquires the digital signals Hi, Hq, Vi and Vq outputted from the filter circuit 19 for a predetermined time, and analyzes a spectrum waveform thereof. The filter control circuit 2 controls the filtering processing in the filter circuit 19 and a central frequency of the local oscillation light Lo in accordance with an analysis result of the spectrum waveform. Hereinafter, the configuration of the filter control circuit 2 is explained.

Figure 5:
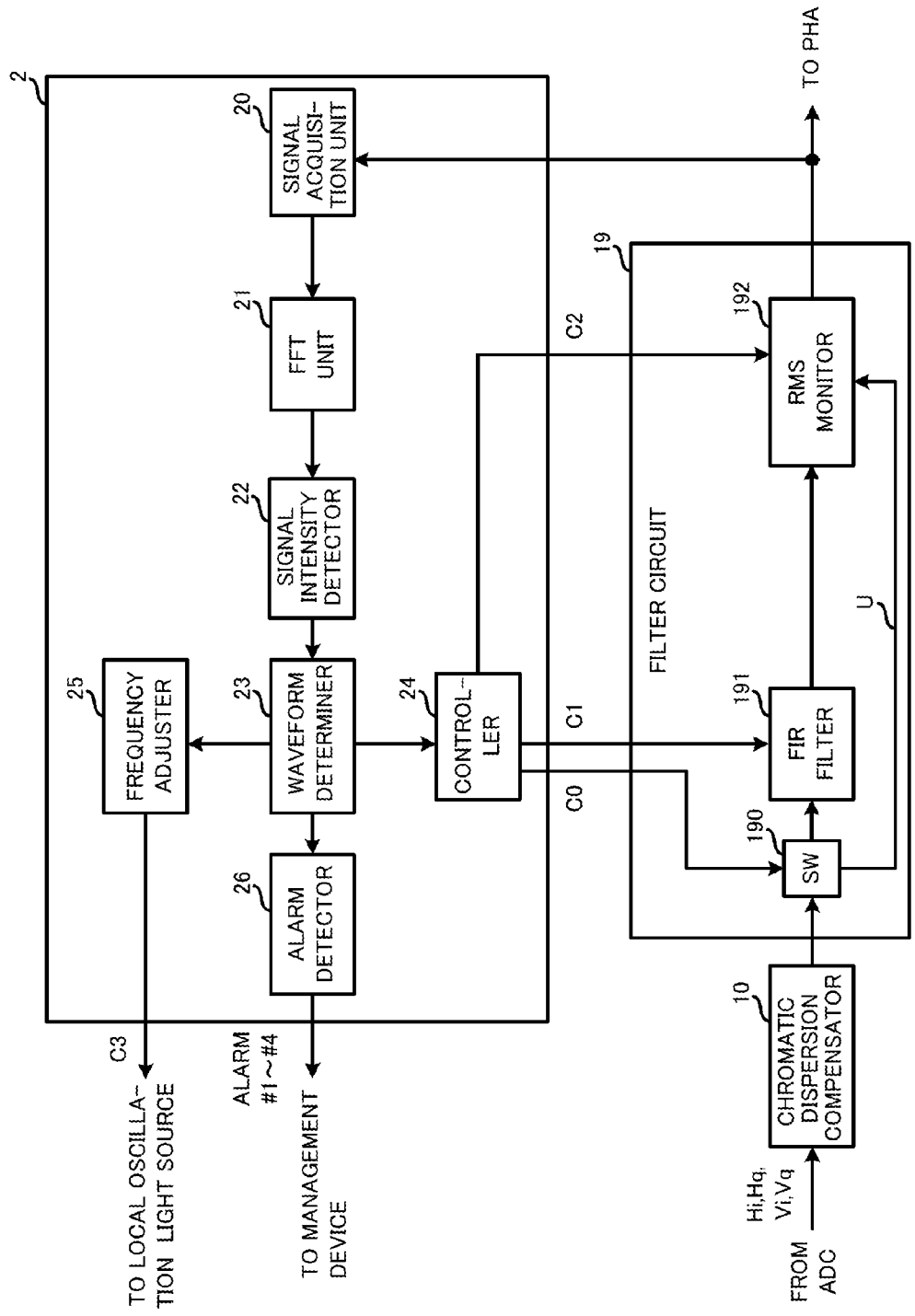
FIG. 5 is a diagram illustrating an example of the configuration of a filter control circuit and a filter circuit.

FIG. 5 is a diagram illustrating an example of the configuration of the filter control circuit 2 and the filter circuit 19. The filter circuit 19 includes a switch 190, a FIR filter 191 and a RMS (Root Mean Square) monitor 192. The filter control circuit 2 includes a signal acquisition unit 20, a FFT (Fast Fourier Transform) unit 21, a signal intensity detector 22, a waveform determiner 23, a controller 24, a frequency adjuster 25, and an alarm detector 26. Here, the filter control circuit 2 and the filter circuit 19 may be provided for each of the digital signals Hi, Hq, Vi and Vq or any one of the digital signals Hi, Hq, Vi and Vq.

The digital signals Hi, Hq, Vi and Vq outputted from the ADC 60 to 63 pass through the chromatic dispersion compensator 10 and are inputted to the filter circuit 19. The digital signals Hi, Hq, Vi and Vq are inputted to the switch 190 in the filter circuit 19.

The switch 190 switches an output destination of the digital signals Hi, Hq, Vi and Vq to any one of the FIR filter 191 and the RMS monitor 192 in accordance with a control signal from the controller 24. When the digital signals Hi, Hq, Vi and Vq are outputted to the RMS monitor 192, the digital signals Hi, Hq, Vi and Vq pass through a detour U.

The FIR filter 191 is an example of a digital filter, and performs the spectral shaping of the digital signals Hi, Hq, Vi and Vq. A tap coefficient of the FIR filter 191 is an example of a filter coefficient, and is controlled based on a control signal C1 from the controller 24. The digital signals Hi, Hq, Vi and Vq on which the spectral shaping is performed are inputted to the RMS monitor 192. A Nyquist filter and a Gaussian filter may be used as substitute for the FIR filter 191, as a means for performing the spectral shaping.

The RMS monitor 192 monitors a power of the digital signals Hi, Hq, Vi and Vq. The RMS monitor 192 outputs to the PHA 11 either ones of the digital signals Hi, Hq, Vi and Vq inputted from the FIR filter 191 and the digital signals Hi, Hq, Vi and Vq inputted from the detour U bypassing the FIR filter 191. The RMS monitor 192 selects the digital signals Hi, Hq, Vi and Vq to be outputted, based on a control signal C2 from the controller 24.

The signal acquisition unit 20 acquires the digital signals Hi, Hq, Vi and Vq outputted from the RMS monitor 192 for a predetermined time. The signal acquisition unit 20 removes noises from waveform data of the acquired digital signals Hi, Hq, Vi and Vq. The signal acquisition unit 20 compares an amplitude value of the waveform with given threshold values, and correct the amplitude value based on a comparison result, for example.

Figure 6A:
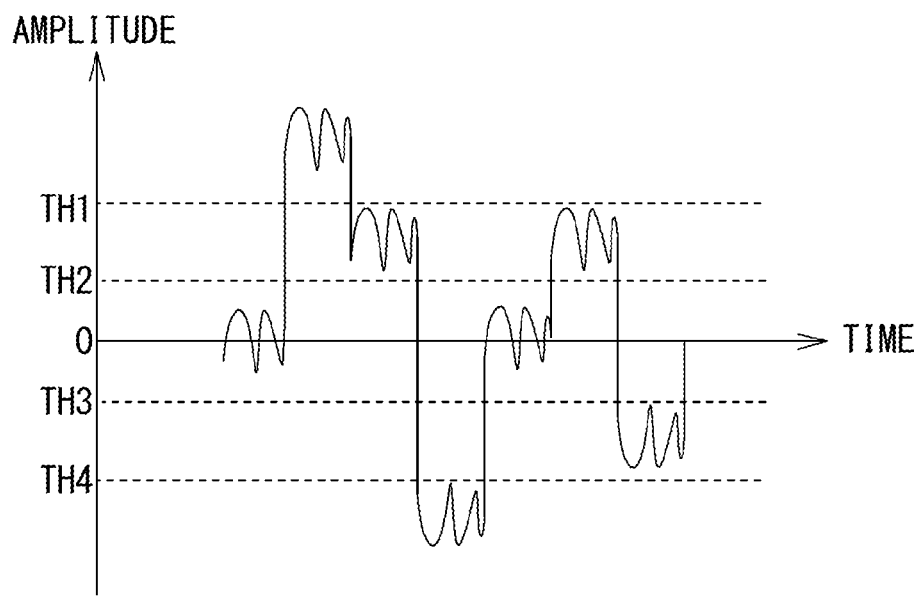
FIG. 6A is a waveform diagram illustrating an example of a signal waveform before noise rejection.
Figure 6B:
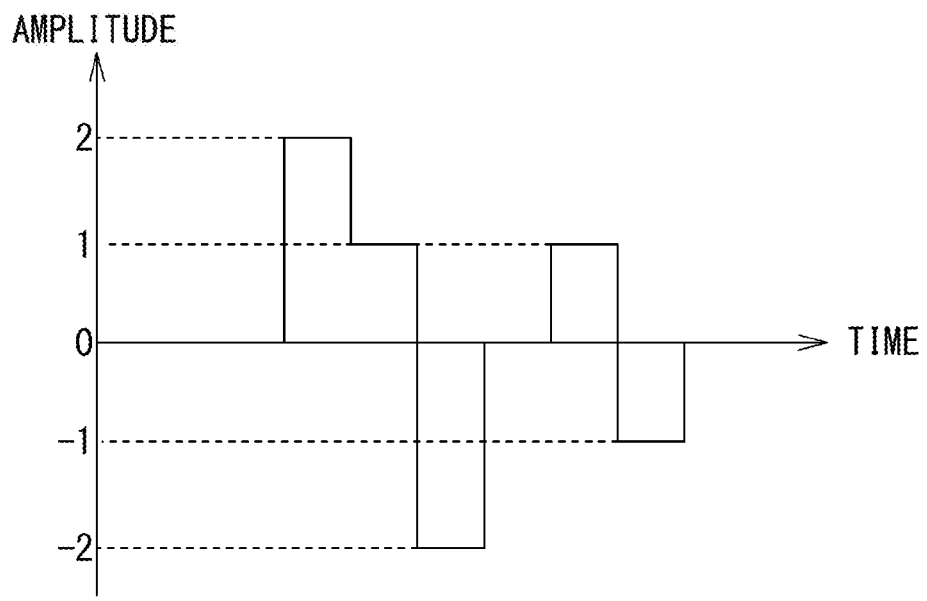
FIG. 6B is a waveform diagram illustrating an example of a signal waveform after the noise rejection.

FIG. 6A is a waveform diagram illustrating an example of a signal waveform before noise rejection. FIG. 6B is a waveform diagram illustrating an example of a signal waveform after the noise rejection. In FIGS. 6A and 6B, a horizontal axis denotes a time, and a vertical axis denotes an amplitude value of the digital signals Hi, Hq, Vi and Vq.

In the present example, the signal acquisition unit 20 compares an amplitude value of the digital signals Hi, Hq, Vi and Vq with given threshold values TH1 to TH4, and corrects the amplitude value based on the comparison result. More specifically, the amplitude value is expressed by Ao, for example, and in the case of TH3≤Ao<TH2, the signal acquisition unit 20 sets 0 to Ao (Ao=0). In the case of TH2≤Ao<TH1, the signal acquisition unit 20 sets 1 to Ao (Ao=1). In the case of TH1≤Ao, the signal acquisition unit 20 sets 2 to Ao (Ao=2). In the case of TH4≤Ao<TH3, the signal acquisition unit 20 sets −1 to Ao (Ao=−1). In the case of TH4>Ao, the signal acquisition unit 20 sets −2 to Ao (Ao=−2). Thereby, the amplitude value is rounded, so that noise components are removed from the waveform, which makes waveform processing at the post-stage easy.

The FFT unit 21 converts the digital signals Hi, Hq, Vi and Vq from signals on a time region to signals on a frequency region by the FFT. The signal intensity detector 22 is an example of an analyzer, and analyzes the spectrum waveform of the digital signals Hi, Hq, Vi and Vq. The waveform determiner 23 is an example of a determiner, and determines whether the spectrum waveform is the Nyquist waveform based on an analysis result of the spectrum.

More specifically, the signal intensity detector 22 detects an intensity of a central wavelength f0 in the spectrum waveform of the digital signals Hi, Hq, Vi and Vq, an intensity of a first wavelength f1 away from the central wavelength f0 at a given interval Δf, and an intensity of a second wavelength f2 symmetrically arranged with the first wavelength f1 with respect to the central wavelength f0. The signal intensity detector 22 notifies the waveform determiner 23 of each of the detected intensities of the central wavelength f0, the first wavelength f1 and the second wavelength f2.

Moreover, the waveform determiner 23 determines whether the spectrum waveform of the digital signals Hi, Hq, Vi and Vq is the Nyquist waveform based on a ratio of the intensities of the central wavelength f0 and the first wavelength f1 or a ratio of the intensities of the central wavelength f0 and the second wavelength f2. Hereinafter, the determination of the waveform is mentioned with the use of an example.

Figure 7A:
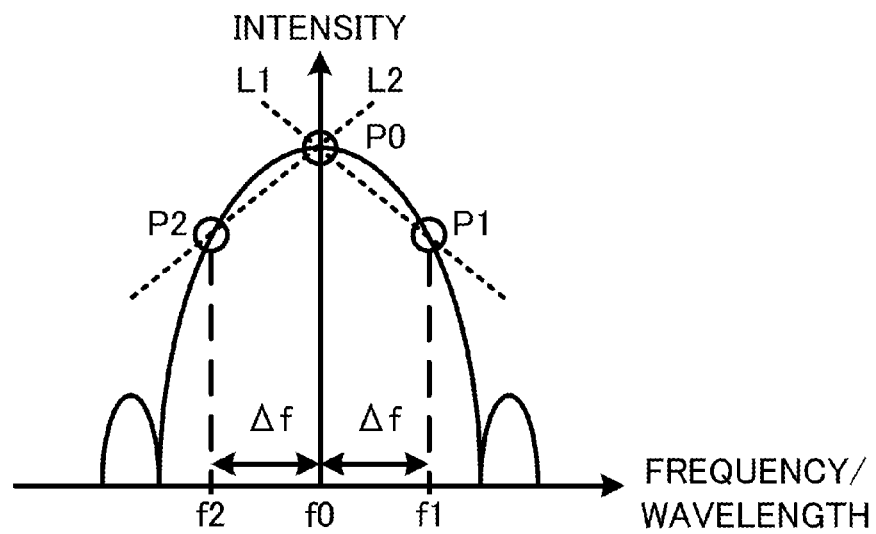
FIG. 7A is a waveform diagram illustrating a determination example of the non-Nyquist waveform.
Figure 7B:
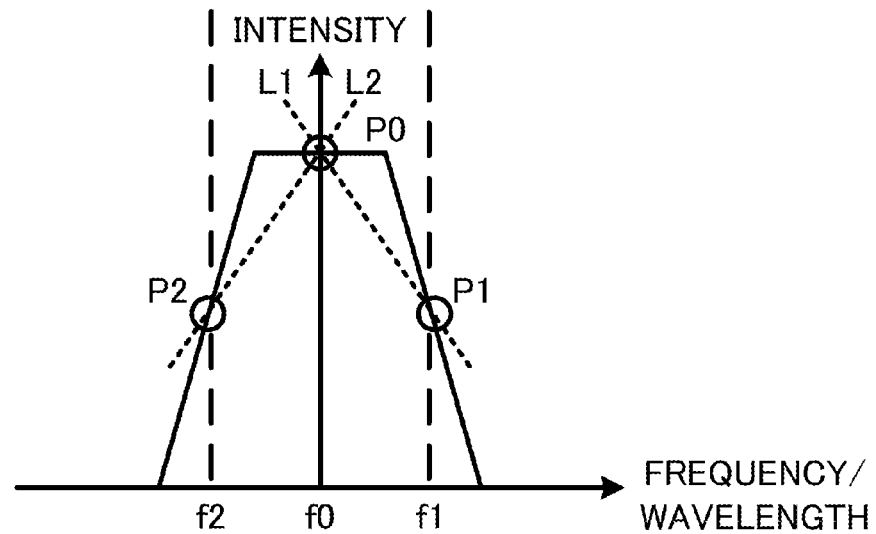
FIG. 7B is a waveform diagram illustrating a determination example of the Nyquist waveform.

FIG. 7A is a waveform diagram illustrating a determination example of the non-Nyquist waveform. FIG. 7B is a waveform diagram illustrating a determination example of the Nyquist waveform. In FIGS. 7A and 7B, a horizontal axis denotes a frequency or a wavelength (=1/frequency), and a vertical axis denotes an intensity of the signals. In the following description, each position on the spectrum waveform depending on each wavelength is denoted, but each position on the spectrum waveform depending on each frequency may be denoted.

The signal intensity detector 22 detects an intensity P0 of the central wavelength f0, an intensity P1 of the first wavelength f1, and an intensity P2 of the second wavelength f2. A frequency difference Δf between the central wavelength f0 and the first wavelength f1 is the same as a frequency difference Δf between the central wavelength f0 and the second wavelength f2. Here, each value of the central wavelength f0, the first wavelength f1 and the second wavelength f2 is set to the signal intensity detector 22 beforehand.

The waveform determiner 23 calculates a ratio P0/P1 of the intensity P0 of the central wavelength f0 to the intensity P1 of the first wavelength f1 in order to measure an inclination of a line segment L1 coupling two points corresponding to the central wavelength f0 and the first wavelength f1 on the spectrum waveform. Since the rise and fall of a pulse of the Nyquist waveform is steeper than that of a pulse of the non-Nyquist waveform, the intensity ratio P0/P1 calculated about the Nyquist waveform is larger than the intensity ratio P0/P1 calculated about the non-Nyquist waveform. Therefore, the waveform determiner 23 can determine a type of the waveform by comparing the intensity ratio P0/P1 with a given value.

In the present embodiment, the type of the waveform is determined based on the intensity ratio P0/P1 of the central wavelength f0 and the first wavelength f1. Alternatively, the type of the waveform can be determined based on an intensity ratio P0/P2 of the central wavelength f0 and the second wavelength f2. In this case, the waveform determiner 23 calculates the ratio P0/P2 of the intensity P0 of the central wavelength f0 to the intensity P2 of the second wavelength f2 in order to measure an inclination of a line segment L2 coupling two points corresponding to the central wavelength f0 and the second wavelength f2 on the spectrum waveform. The intensity P2 of the second wavelength f2 is used for detection of a frequency offset of the local oscillation light Lo together with the intensity P1 of the first wavelength f1, as mentioned later.

Figure 8:
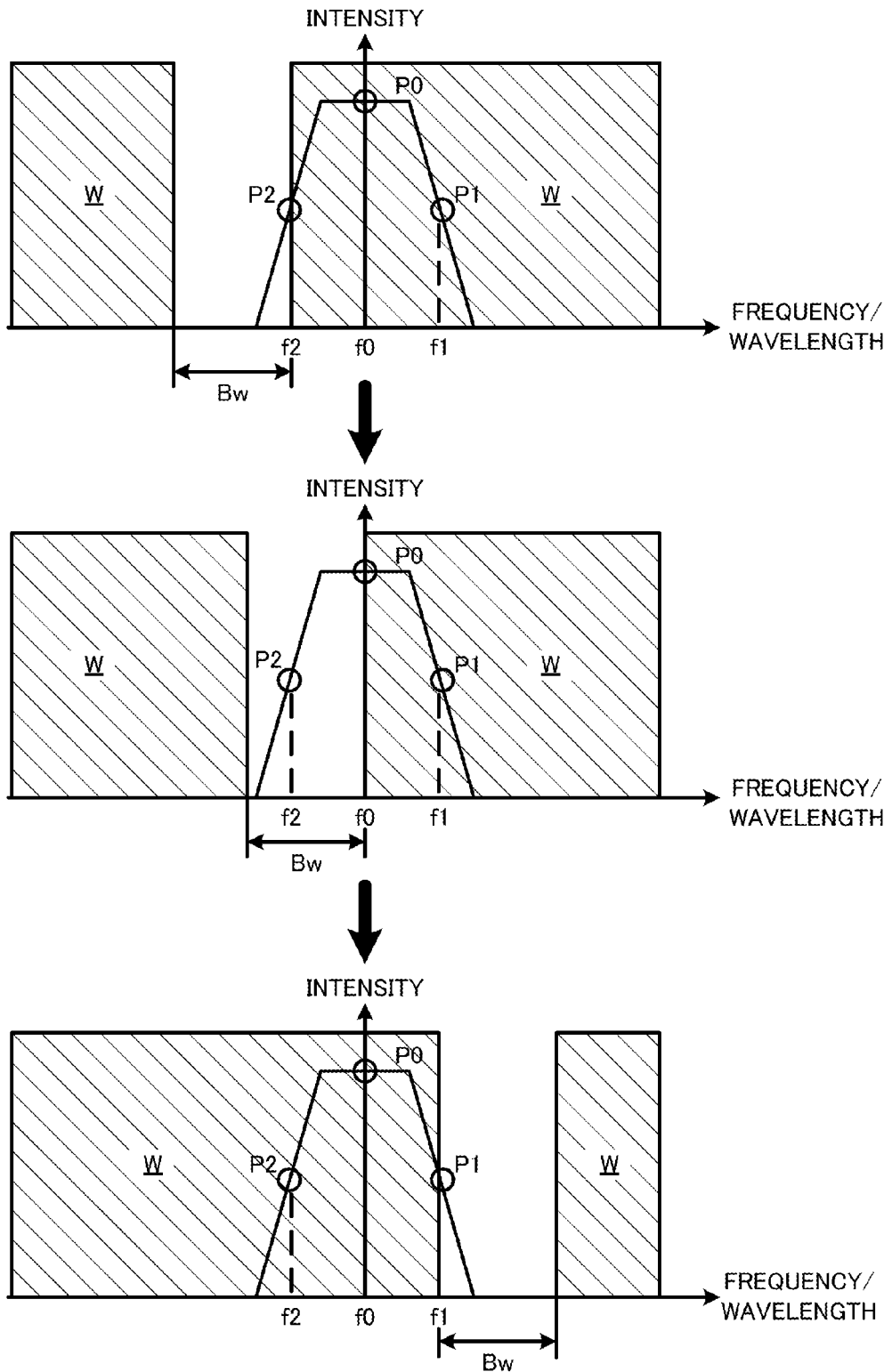
FIG. 8 is a diagram illustrating an example of an intensity detection operation in a signal intensity detector.

FIG. 8 illustrates an example of an intensity detection operation in the signal intensity detector 22. The signal intensity detector 22 detects the intensity P0 of the central wavelength f0, the intensity P1 of the first wavelength f1 and the intensity P2 of the second wavelength f2 by performing filtering processing of the spectrum waveform while transferring a pass band Bw of the filter. Here, signs "W" indicate cutoff regions of the filter. Arrows in FIG. 8 indicate an order of the detection processing.

First, the signal intensity detector 22 makes an upper end (i.e, a high frequency side) of the pass band Bw coincident with the second wavelength f2 and performs peak detection to detect the intensity P2 of the second wavelength f2. Next, the signal intensity detector 22 makes the upper end of the pass band Bw coincident with the central wavelength f0 and performs the peak detection to detect the intensity P0 of the central wavelength f0. Finally, the signal intensity detector 22 makes a lower end (i.e, a low frequency side) of the pass band Bw coincident with the first wavelength f1 and performs the peak detection to detect the intensity P1 of the first wavelength f1. Therefore, the signal intensity detector 22 can detect the intensities P0 to P2 of the signal in a series of operations smoothly. Although FIG. 8 illustrates an example of the detection of the signal intensity in the case of the Nyquist waveform, the detection of the intensities P0 to P2 is performed by the same procedure also in the case of the non-Nyquist waveform.

The waveform determiner 23 notifies the controller 24 of the detection result of the spectrum waveform. When the spectrum waveform of the digital signals Hi, Hq, Vi and Vq is not the Nyquist waveform, i.e., the spectrum waveform is the non-Nyquist waveform, the controller 24 outputs the control signal C0 to the switch 190 to stop the spectral shaping to the digital signals Hi, Hq, Vi and Vq of the FIR filter 191. Thereby, an output destination of the digital signals Hi, Hq, Vi and Vq of the switch 190 is switched to the RMS monitor 192. At this time, the digital signals Hi, Hq, Vi and Vq are outputted to the RMS monitor 192 via the detour U, and hence the spectral shaping by the FIR filter 191 is not performed.

When the spectrum waveform of the digital signals Hi, Hq, Vi and Vq is not the Nyquist waveform, the controller 24 outputs the control signal C2 to the RMS monitor 192. At this time, the RMS monitor 192 outputs the digital signals Hi, Hq, Vi and Vq inputted from the detour U to the PHA 11 according to the control signal C2.

For this reason, the digital signals Hi, Hq, Vi and Vq on which the spectral shaping by the FIR filter 191 is not performed are outputted to post-stage circuits behind the PHA 11. Therefore, in the case of the non-Nyquist waveform, the spectral shaping by the FIR filter 191 is not performed on the digital signals Hi, Hq, Vi and Vq, so that the reception characteristics do not deteriorate by the deletion of both edges of the non-Nyquist waveform as illustrated in FIG. 3B. Here, a stop means of waveform distortion compensation by the FIR filter 191 is not limited to the above-mentioned bypass processing. For example, a function of the FIR filter 191 itself may be stopped.

On the other hand, when the spectrum waveform of the digital signals Hi, Hq, Vi and Vq is the Nyquist waveform, the controller 24 controls the tap coefficient of the FIR filter 191 based on the spectrum waveform of the digital signals Hi, Hq, Vi and Vq. Therefore, in the case of the Nyquist waveform, the spectral shaping is performed on the digital signals Hi, Hq, Vi and Vq with the use of a suitable tap coefficient, as illustrated in FIG. 3A, for example.

More specifically, the controller 24 controls the tap coefficient of the FIR filter 191 based on the intensity ratio P0/P1 of the central wavelength f0 and the first wavelength f1. Since the inclination of the rise and fall of the Nyquist waveform changes in accordance with a roll-off rate of the filter in the case of the shaping of the Nyquist waveform, the controller 24 controls the tap coefficient in accordance with the intensity ratio P0/P1, i.e., the inclination of the line L1 (L2) in FIG. 7B, and enables optimum filtering processing.

Moreover, the waveform determiner 23 notifies the frequency adjuster 25 of a difference (|P1−P2|) between the intensity P1 of the first wavelength f1 and the intensity P2 of the second wavelength f2. The frequency adjuster 25 adjusts the central frequency of the local oscillation light Lo in accordance with the difference between the intensity P1 of the first wavelength f1 and the intensity P2 of the second wavelength f2.

More specifically, the frequency adjuster 25 determines whether the difference between the intensity P1 of the first wavelength f1 and the intensity P2 of the second wavelength f2 is equal to or more than a given value K (i.e., |P1−P2|≥K). When the |P1−P2|≥K is satisfied, the frequency adjuster 25 determines that the frequency offset of the local oscillation light Lo occurs, and outputs a control signal C3 to the local oscillation light source 3. The control signal C3 includes information on an adjustment amount of the frequency on the basis of the difference between the intensities P1 and P2. The local oscillation light source 3 adjusts the central frequency of the local oscillation light Lo in accordance with the control signal C3.

Figure 9A:
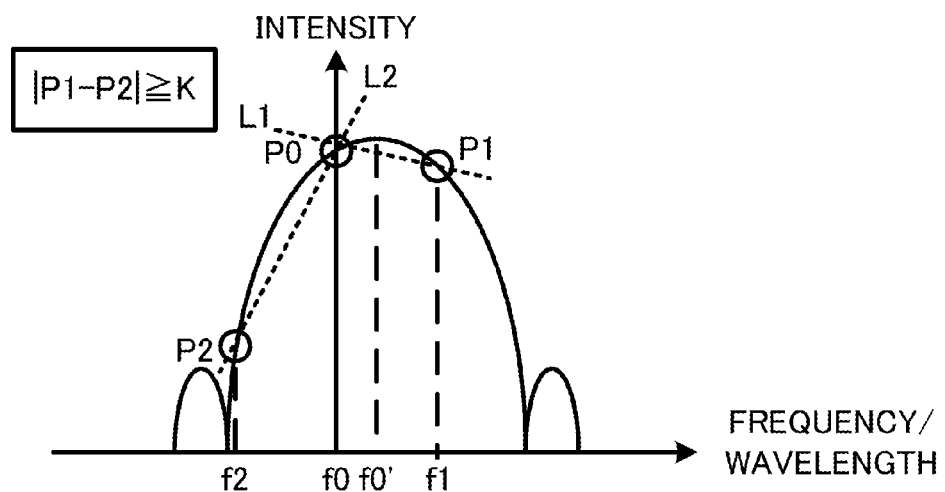
FIG. 9A is a waveform diagram illustrating an example of the non-Nyquist waveform at the time of a frequency offset.
Figure 9B:
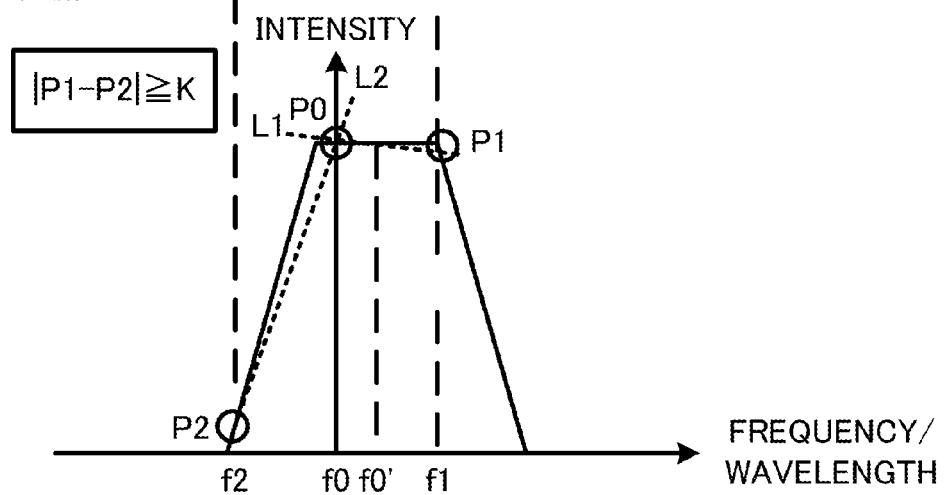
FIG. 9B is a waveform diagram illustrating an example of the Nyquist waveform at the time of the frequency offset.

FIG. 9A is a waveform diagram illustrating an example of the non-Nyquist waveform at the time of the frequency offset. FIG. 9B is a waveform diagram illustrating an example of the Nyquist waveform at the time of the frequency offset. In FIGS. 9A and 9B, a wavelength f0' is a central wavelength of the spectrum waveform affected by the frequency offset.

Since the first wavelength f1 and the second wavelength f2 are placed symmetrically with the central wavelength f0 therebetween, the intensity P1 of the first wavelength f1 is substantially the same as the intensity P2 of the second wavelength f2 when there is no frequency offset. However, when the frequency offset occurs, the central wavelength is shifted from a setting value f0 and becomes f0', and hence the difference between the intensity P1 of the first wavelength f1 and the intensity P2 of the second wavelength f2 increases.

Therefore, when the |P1−P2|≥K is satisfied, the frequency adjuster 25 corrects the deviation of the central wavelength f0 by adjusting the central frequency of the local oscillation light Lo. Thereby, the waveform determiner 23 can perform normal determination.

Referring to FIG. 5 again, the alarm detector 26 is an example of an abnormality detector, and detects an abnormality of the spectrum waveform of the digital signals Hi, Hq, Vi and Vq based on the intensity P0 of the central wavelength f0 or the ratio P0/P1 of the intensity P0 of the central wavelength f0 to the intensity P1 of the first wavelength f1 which is notified from the waveform determiner 23. The alarm detector 26 outputs the abnormality of the spectrum waveform to a management device, not shown, as alarms #1 to #4. Hereinafter, each of the alarms #1 to #4 is mentioned.

Figure 10A:
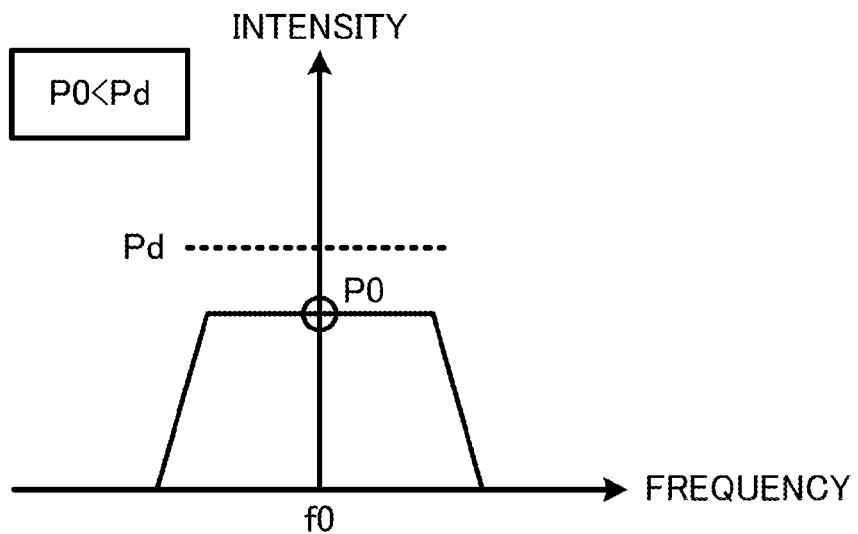
FIG. 10A is a waveform diagram illustrating a detection example of an alarm #1.

FIG. 10A is a waveform diagram illustrating a detection example of the alarm #1. When the intensity P0 of the central wavelength f0 is less than a given threshold value Pd (i.e., when P0<Pd is satisfied), the alarm detector 26 detects the alarm #1. By outputting the alarm #1, the alarm detector 26 notifies the management device that the intensity P0 of the central wavelength f0 of the spectrum waveform is low excessively.

Figure 10B:
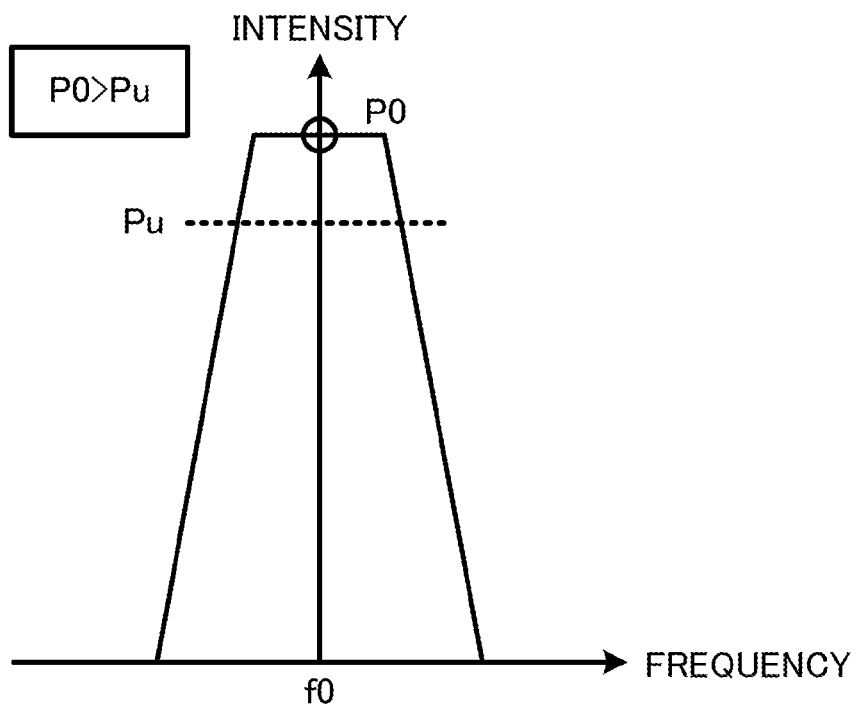
FIG. 10B is a waveform diagram illustrating a detection example of an alarm #2.

FIG. 10B is a waveform diagram illustrating a detection example of the alarm #2. When the intensity P0 of the central wavelength f0 is more than a given threshold value Pu (>Pd) (i.e., when P0>Pu is satisfied), the alarm detector 26 detects the alarm #2. By outputting the alarm #2, the alarm detector 26 notifies the management device that the intensity P0 of the central wavelength f0 of the spectrum waveform is high excessively. Here, the threshold values Pu and Pd are decided in accordance with the characteristics of the digital signals Hi, Hq, Vi and Vq.

Figure 11A:
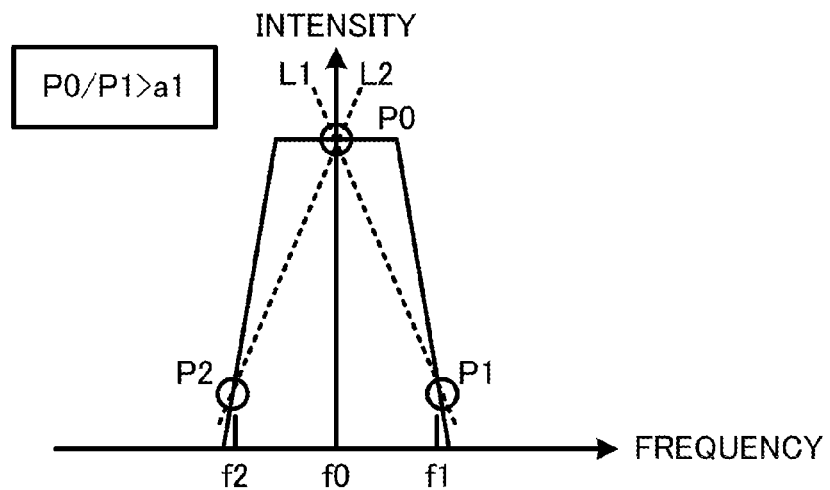
FIG. 11A is a waveform diagram illustrating a detection example of an alarm #3.

FIG. 11A is a waveform diagram illustrating a detection example of the alarm #3. When the ratio P0/P1 of the intensity P0 of the central wavelength f0 to the intensity P1 of the first wavelength f1 is more than a given threshold value a1 (i.e., when P0/P1>a1 is satisfied), the alarm detector 26 detects the alarm #3. By outputting the alarm #3, the alarm detector 26 notifies the management device that the edges of the spectrum waveform are deleted excessively.

Figure 11B:
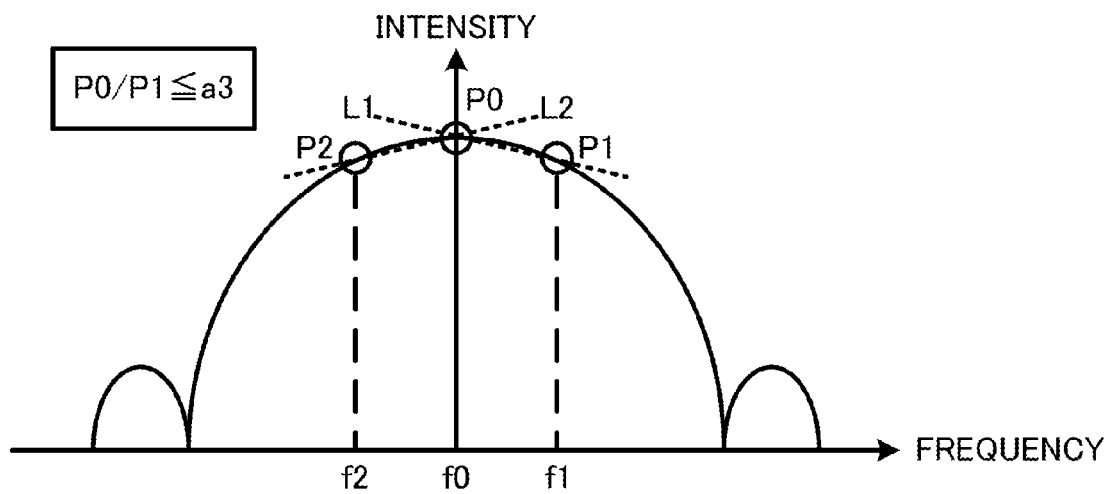
FIG. 11B is a waveform diagram illustrating a detection example of an alarm #4.

FIG. 11B is a waveform diagram illustrating a detection example of the alarm #4. When the ratio P0/P1 of the intensity P0 of the central wavelength f0 to the intensity P1 of the first wavelength f1 is equal to or less than a given threshold value a3 (<a1) (i.e., when P0/P1≤a3 is satisfied), the alarm detector 26 detects the alarm #4. By outputting the alarm #4, the alarm detector 26 notifies the management device that the spectrum waveform is spread excessively.

Figure 12:
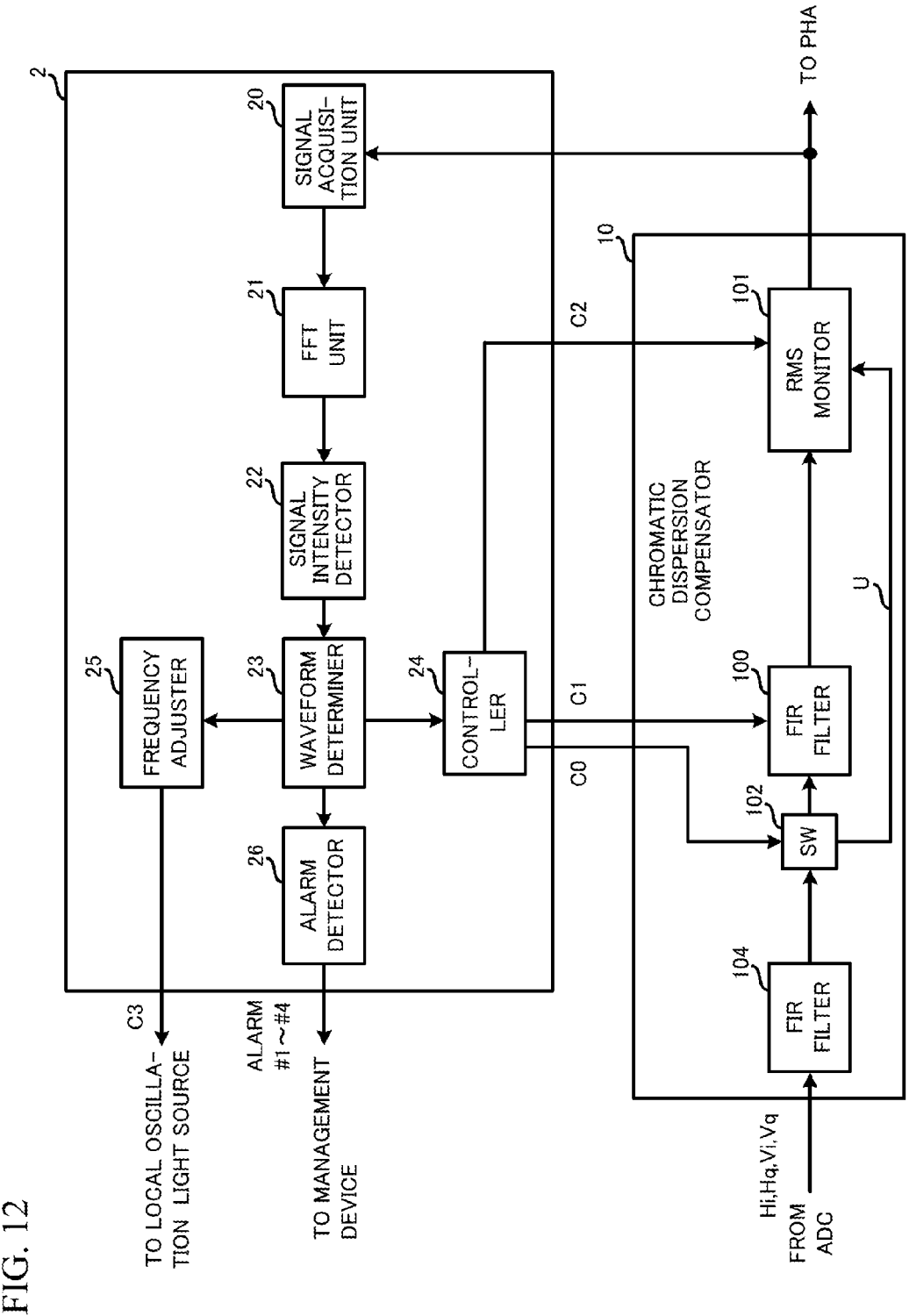
FIG. 12 is a diagram illustrating another example of the configuration of the filter control circuit and a wavelength dispersion compensation circuit.

Moreover, the function of the filter circuit 19 mentioned above may be included in the chromatic dispersion compensator 10. FIG. 12 is a diagram illustrating another example of the configuration of the filter control circuit 2 and the chromatic dispersion compensator 10. Corresponding elements to those of FIG. 5 are designated by the same reference numerals, and description of these elements is omitted.

The chromatic dispersion compensator 10 includes a switch 102, FIR filters 100 and 104, a RMS monitor 101. The FIR filter 104 compensates the waveform distortion of the digital signals Hi, Hq, Vi and Vq caused by the chromatic dispersion by the filtering processing.

The switch 102, the FIR filter 100 and the RMS monitor 101 have the same functions as the switch 190, the FIR filter 191 and the RMS monitor 192 of FIG. 5, respectively. The controller 24 outputs the above-mentioned control signals C0 to C2 to the switch 102, the FIR filter 100 and the RMS monitor 101, respectively. Therefore, in the configuration of FIG. 12, the same effect as the configuration of FIG. 5 is also obtained.

Figure 13:
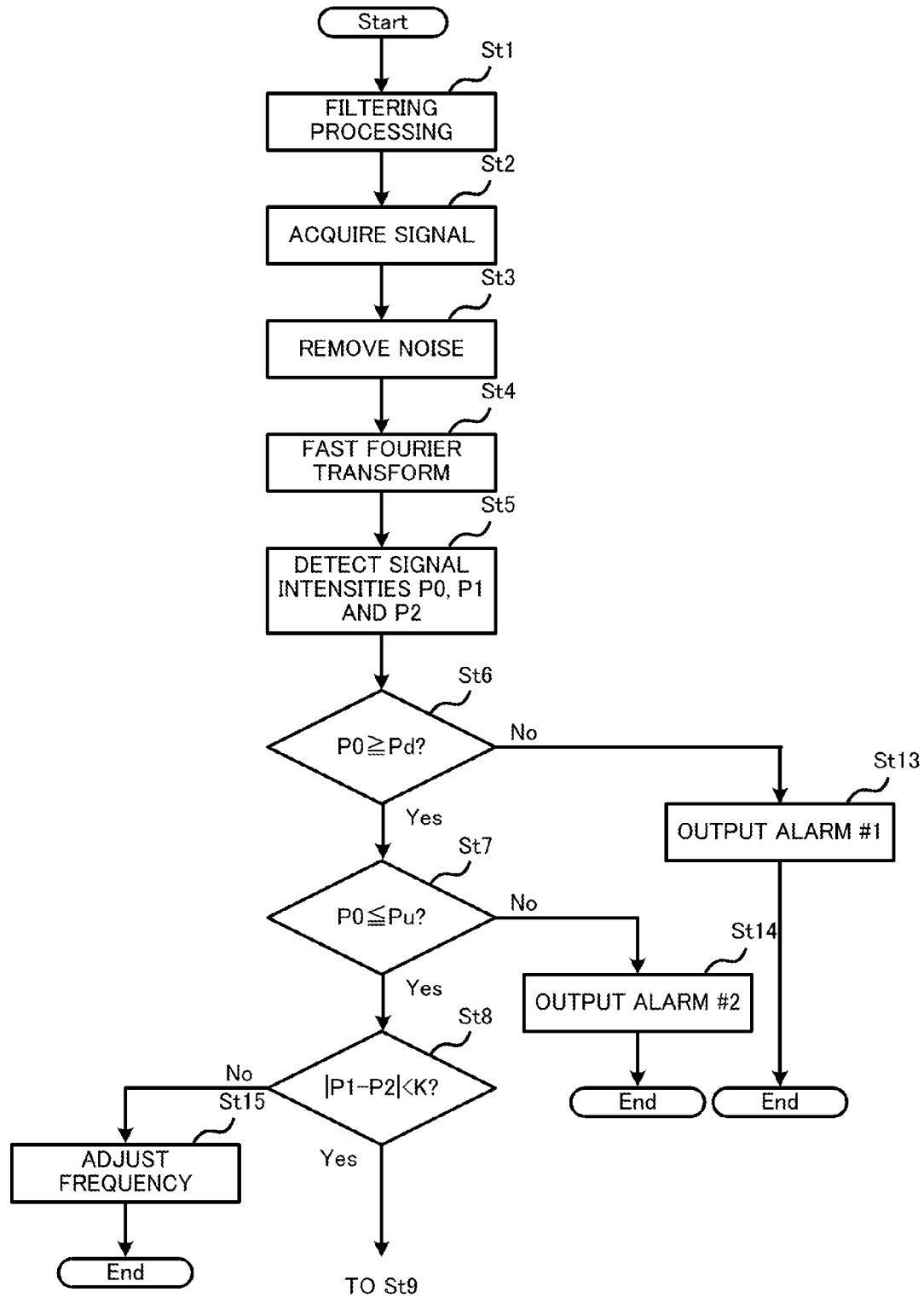
FIG. 13 is a flowchart illustrating an example of a signal processing method of the optical receiver (Part 1)
Figure 14:
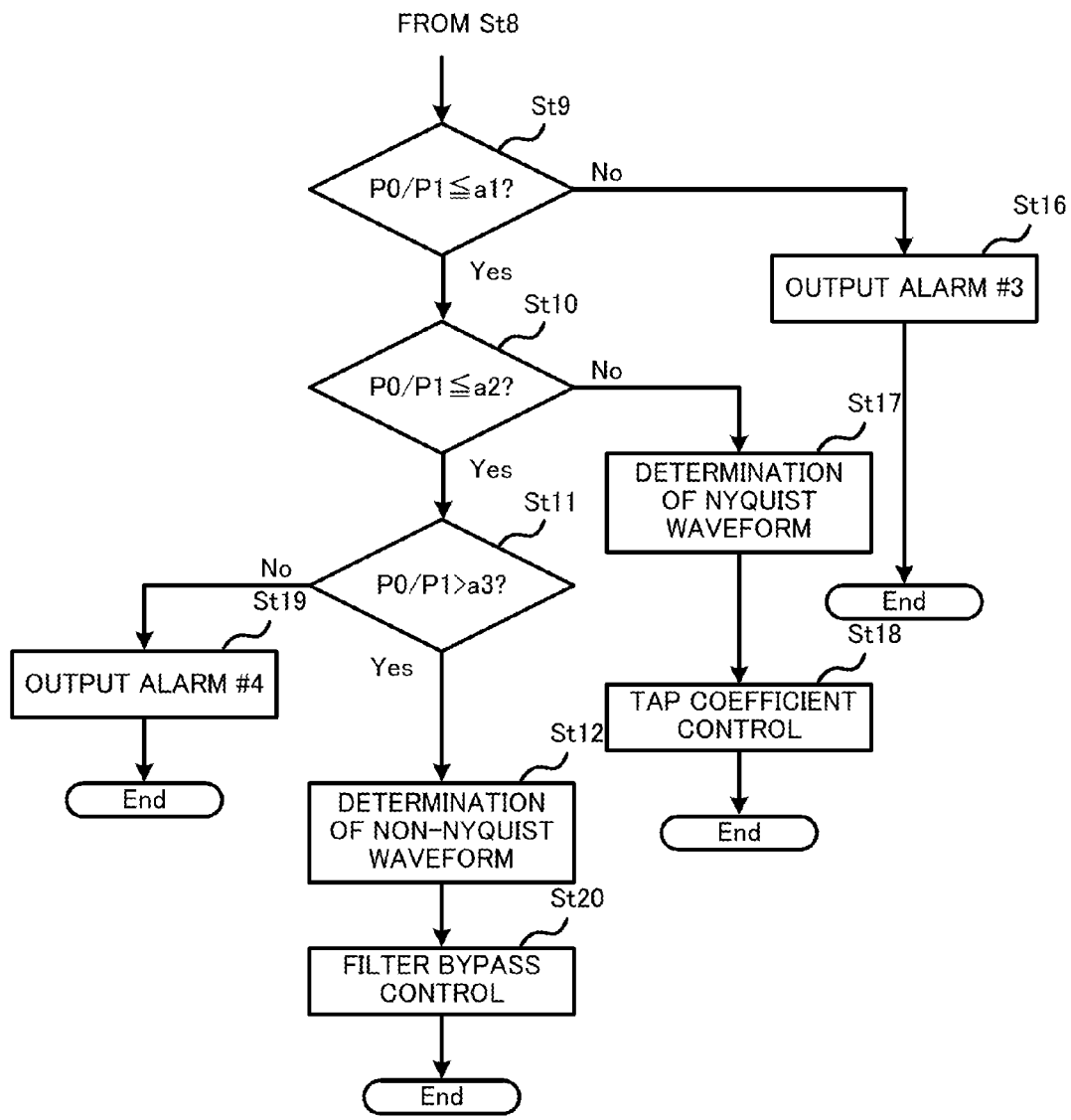
FIG. 14 is a flowchart illustrating an example of the signal processing method of the optical receiver (Part 2).

Next, a signal processing method of the above-mentioned optical receiver 9 is mentioned. FIGS. 13 and 14 are flowcharts illustrating an example of the signal processing method of the optical receiver 9. The present processing premises an example of the configuration of FIG. 5, but the same processing is also performed in the case of the configuration of FIG. 12.

First, the FIR filter 191 performs the filtering processing of the digital signals Hi, Hq, Vi and Vq (step SU). More specifically, the optical receiver 9 performs the spectral shaping on the digital signals Hi, Hq, Vi and Vq by making the digital signals Hi, Hq, Vi and Vq pass through the FIR filter 191.

Next, the signal acquisition unit 20 acquires the waveform data of the digital signals Hi, Hq, Vi and Vq outputted from the RMS monitor 192 for a predetermined time (step St2). The signal acquisition unit 20 removes noises from the waveform data of the digital signals Hi, Hq, Vi and Vq by using a method illustrated in FIGS. 6A and 6B (step St3). The FFT unit 21 performs fast Fourier transform on the waveform data of the digital signals Hi, Hq, Vi and Vq (step St4). Thereby, the digital signals Hi, Hq, Vi and Vq are converted from signals on the time region to signals on the frequency region, and therefore the spectrum waveform of the digital signals Hi, Hq, Vi and Vq is acquired.

Next, the signal intensity detector 22 can detect the intensity P0 of the central wavelength f0 of the spectrum waveform, the intensity P1 of the first wavelength f1 and the intensity P2 of the second wavelength f2 by using a method illustrated in FIG. 8 (step St5). That is, the signal intensity detector 22 analyzes the spectrum waveform of the digital signals Hi, Hq, Vi and Vq.

Next, the alarm detector 26 compares the intensity P0 of the central wavelength f0 with the given threshold value Pd (step St6). When the P0<Pd is satisfied (NO in step St6), the alarm detector 26 outputs the alarm #1 (step St13). When the P0≥Pd is satisfied (NO in step St6), the alarm detector 26 compares the intensity P0 of the central wavelength f0 with the given threshold value Pu (step St7).

When the P0>Pu is satisfied (NO in step St7), the alarm detector 26 outputs the alarm #2 (step St14). When the P0≤Pu is satisfied (NO in step St7), the frequency adjuster 25 determines whether the difference between the intensity P1 of the first wavelength f1 and the intensity P2 of the second wavelength f2 is equal to or more than the given value K (step St8). When the |P1−P2|≥K is satisfied (NO in step St8), the frequency adjuster 25 adjusts the central frequency of the local oscillation light Lo by the control signal C3 (step St15).

When the |P1−P2|<K is satisfied (YES in step St8), the alarm detector 26 compares the ratio P0/P1 of the intensity P0 of the central wavelength f0 to the intensity P1 of the first wavelength f1 with the given threshold value a1 (step St9). When the P0/P1>a1 is satisfied (NO in step St9), the alarm detector 26 outputs the alarm #3 (step St16). When the P0/P1≤a1 is satisfied (YES in step St9), the waveform determiner 23 compares the ratio P0/P1 of the intensity P0 of the central wavelength f0 to the intensity P1 of the first wavelength f1 with a given threshold value a2 (step St10). Here, the threshold values a1 to a3 are decided in accordance with the characteristics of the digital signals Hi, Hq, Vi and Vq so as to satisfy a relationship "a3<a2<a1".

When the P0/P1>a2 is satisfied (NO in step St10), the waveform determiner 23 determines that the spectrum waveform is the Nyquist waveform (step St17). That is, in the case of a2<P0/P1≤a1, the waveform determiner 23 determines that the spectrum waveform is the Nyquist waveform. The waveform determiner 23 notifies the controller 24 of the determination result.

The controller 24 controls the tap coefficient of the FIR filter 191 by the control signal C1 in accordance with the determination result (step St18). At this time, the controller 24 decides the tap coefficient based on the ratio P0/P1 of the intensity P0 of the central wavelength f0 to the intensity P1 of the first wavelength f1.

When the P0/P1≤a2 is satisfied (YES in step St10), the waveform determiner 23 compares the ratio P0/P1 of the intensity P0 of the central wavelength f0 to the intensity P1 of the first wavelength f1 with the given threshold value a3 (step St11). When the P0/P1≤a3 is satisfied (NO in step St11), the alarm detector 26 outputs the alarm #4 (step St19).

When the P0/P1>a3 is satisfied (YES in step St11), the waveform determiner 23 determines that the spectrum waveform is the non-Nyquist waveform (step St12). That is, in the case of a3<P0/P1≤a2, the waveform determiner 23 determines that the spectrum waveform is the non-Nyquist waveform. The waveform determiner 23 notifies the controller 24 of the determination result.

The controller 24 controls the switch 190 by the control signal C0 and the RMS monitor 192 by the control signal C2 according to the determination result so that the digital signals Hi, Hq, Vi and Vq from the detour U are outputted to the PHA 11 (step St20). Thereby, the digital signals Hi, Hq, Vi and Vq bypass the FIR filter 191.

Thus, the waveform determiner 23 determines whether the spectrum waveform is the Nyquist waveform based on the analysis result of the spectrum waveform. When the spectrum waveform is not the Nyquist waveform as a result of the determination, the controller 24 stops the spectral shaping of the digital signals Hi, Hq, Vi and Vq to be performed by the FIR filter 191. Moreover, when the spectrum waveform is the Nyquist waveform, the controller 24 controls the tap coefficient of the FIR filter 191 based on the spectrum waveform. In this way, the optical receiver 9 performs the signal processing.

As described above, the optical receiver 9 according to the embodiment includes the FIR filter 100 or 191, the signal intensity detector 22, the waveform determiner 23, and the controller 24. The FIR filter 100 or 191 performs the spectral shaping on the received digital signals Hi, Hq, Vi and Vq. The signal intensity detector 22 analyzes the spectrum waveform of the digital signals Hi, Hq, Vi and Vq. The waveform determiner 23 determines whether the spectrum waveform of the digital signals Hi, Hq, Vi and Vq is the Nyquist waveform on the basis of the Nyquist first reference, based on the analysis result by the signal intensity detector 22.

When the spectrum waveform is not the Nyquist waveform as a result of the determination of the waveform determiner 23, the controller 24 stops the spectral shaping of the digital signals Hi, Hq, Vi and Vq to be performed by the FIR filter 100 or 191. Moreover, when the spectrum waveform is the Nyquist waveform, the controller 24 controls a filter coefficient of the FIR filter 100 or 191 based on the spectrum waveform.

According to the above-mentioned configuration, in the case of the non-Nyquist waveform, the controller 24 stops the spectral shaping to be performed by the FIR filter 100 or 191, so that the reception characteristics of the digital signals Hi, Hq, Vi and Vq do not deteriorate by the deletion of both edges of the spectrum waveform. On the other hand, in the case of the Nyquist waveform, the controller 24 controls the tap coefficient of the FIR filter 100 or 191 based on the spectrum waveform of the digital signals Hi, Hq, Vi and Vq, so that the waveform distortion of the digital signals Hi, Hq, Vi and Vq is compensated by the suitable tap coefficient.

Accordingly, the optical receiver 9 can autonomously adjust the reception characteristics of the optical signal S without receiving a control signal for controlling filtering from the optical transmitter 8. Therefore, the optical receiver 9 according to the embodiment can improve the reception characteristics without decreasing the transmission efficiency of the user signal.

Moreover, the signal processing method according to the embodiment includes the following steps;

Step (1): performing the spectral shaping on the digital signals Hi, Hq, Vi and Vq by making the received digital signals Hi, Hq, Vi and Vq pass through the FIR filter 100 or 191;

Step (2): analyzing the spectrum waveform of the digital signals Hi, Hq, Vi and Vq;

Step (3): determining, based on a result of the analyzing, whether the spectrum waveform of the digital signals Hi, Hq, Vi and Vq is the Nyquist waveform on the basis of the Nyquist first reference; and Step (4): stopping the spectral shaping of the digital signals Hi, Hq, Vi and Vq to be performed by the FIR filter 100 or 191 when the spectrum waveform is not the Nyquist waveform as a result of the determining, and controlling the filter coefficient of the FIR filter 100 or 191 based on the spectrum waveform when the spectrum waveform is the Nyquist waveform as the result of the determining.

The signal processing method according to the embodiment includes the same features as the above-mentioned optical receiver 9, and hence the signal processing method can obtain the same effects as the optical receiver 9.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An optical receiver comprising:
a digital filter that performs spectral shaping on a signal;
an analyzer that analyzes a spectrum waveform of the signal;
a determiner that determines, based on an analysis result by the analyzer, whether the spectrum waveform of the signal is a Nyquist waveform on the basis of a Nyquist first reference; and
a controller that stops the spectral shaping of the signal to be performed by the digital filter when the spectrum waveform of the signal is not the Nyquist waveform as a result of the determination by the determiner, and controls a filter coefficient of the digital filter based on the spectrum waveform of the signal when the spectrum waveform of the signal is the Nyquist waveform as the result of the determination by the determiner.

2. The optical receiver as claimed in claim 1, wherein
the analyzer detects an intensity of a central wavelength of the spectrum waveform of the signal and an intensity of a first wavelength away from the central wavelength at a given interval, and
the determiner determines whether the spectrum waveform of the signal is the Nyquist waveform, based on a ratio of the intensity of the central wavelength and the intensity of the first wavelength.

3. The optical receiver as claimed in claim 2, wherein
when the spectrum waveform of the signal is the Nyquist waveform as the result of the determination by the determiner, the controller controls the filter coefficient of the digital filter based on the ratio of the intensity of the central wavelength and the intensity of the first wavelength.

4. The optical receiver as claimed in claim 2, further comprising:
an abnormality detector that detects an abnormality of the spectrum waveform of the signal based on any one of the intensity of the central wavelength and the ratio of the intensity of the central wavelength and the intensity of the first wavelength.

5. The optical receiver as claimed in claim 2, further comprising:
an light source that outputs a light;
a receiver that receives the signal by making the light interfere with an optical signal inputted from a transmission line and converting the optical signal into an electric signal; and
an adjuster that adjusts a central frequency of the light;
wherein the determiner detects an intensity of a second wavelength symmetrically arranged with the first wavelength with respect to the central wavelength, and
the adjuster adjusts the central frequency of the light in accordance with a difference between the intensity of the first wavelength and the intensity of the second wavelength.

6. A signal processing method comprising:
performing spectral shaping on a signal by a digital filter;
analyzing a spectrum waveform of the signal by a circuit;
determining, based on a result of the analyzing, whether the spectrum waveform of the signal is a Nyquist waveform on the basis of a Nyquist first reference by the circuit; and
stopping, by the circuit, the spectral shaping of the signal to be performed by the digital filter when the spectrum waveform is not the Nyquist waveform as a result of the determining; and
controlling, by the circuit, a filter coefficient of the digital filter based on the spectrum waveform of the signal when the spectrum waveform is the Nyquist waveform as the result of the determining.

7. The signal processing method as claimed in claim 6, wherein
the analyzing detects an intensity of a central wavelength of the spectrum waveform of the signal and an intensity of a first wavelength away from the central wavelength at a given interval, and
the determining determines whether the spectrum waveform of the signal is the Nyquist waveform, based on a ratio of the intensity of the central wavelength and the intensity of the first wavelength.

8. The signal processing method as claimed in claim 7, wherein
when the spectrum waveform of the signal is the Nyquist waveform as the result of the determining, the controlling controls the filter coefficient of the digital filter based on the ratio of the intensity of the central wavelength and the intensity of the first wavelength.

9. The signal processing method as claimed in claim 7, further comprising:
detecting an abnormality of the spectrum waveform of the signal based on any one of the intensity of the central wavelength and the ratio of the intensity of the central wavelength and the intensity of the first wavelength by the circuit.

10. The signal processing method as claimed in claim 7, further comprising:
receiving, by a receiver, the signal by making a light interfere with an optical signal inputted from a transmission line and converting the optical signal into an electric signal;
detecting, by the circuit, an intensity of a second wavelength symmetrically arranged with the first wavelength with respect to the central wavelength; and
adjusting, by the circuit, a central frequency of the light in accordance with a difference between the intensity of the first wavelength and the intensity of the second wavelength.

* * * * *